Figure 1:
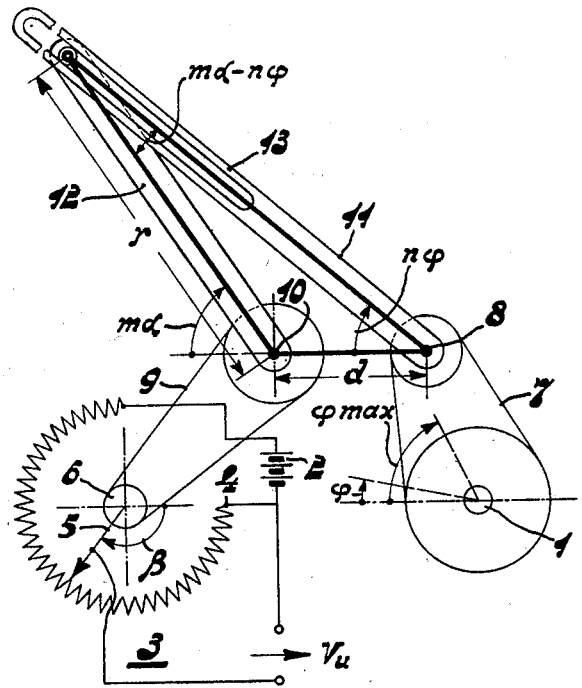

July 2, 1957 — C. LE COMTE — 2,797,864
DEVICE FOR PRODUCING A VOLTAGE VARYING LINEARLY
WITH THE SINE OF AN INPUT ANGLE
Filed May 11, 1953

INVENTOR
CORSTIAAN LE COMTE
BY
AGENT

United States Patent Office 2,797,864
Patented July 2, 1957

2,797,864

DEVICE FOR PRODUCING A VOLTAGE VARYING LINEARLY WITH THE SINE OF AN INPUT ANGLE

Corstiaan Le Comte, Hilversum, Netherlands, assignor, by mesne assignments, to North American Philips Company, Inc., New York, N. Y., a corporation of Delaware Application May 11, 1953, Serial No. 354,304

Claims priority, application Netherlands May 17, 1952

5 Claims. (Cl. 235—61)

The invention relates to a device for producing a voltage $V_u$, which varies linearly with the sinus of an input angle $\varphi$ of an input shaft, so that $V_u = a.\sin \varphi$, if $a$ designates a constant value.

Such devices are of importance, for example, for determining the height of an aircraft from data about the distance and the elevation of the aircraft obtained by radar sounding.

For this purpose, it is true, special potentiometers may be used, the resistance characteristic curve of which varies in accordance with the sine of an angle varying between for example 0° and 55°, but these special potentiometers are particularly costly, in particular if the tolerance should be smaller than 1%. It is therefore desirable to use potentiometers having a linear characteristic curve, which can, of course, be manufactured in a simpler manner and may have tolerance of about 1%.

The invention has for its object to provide a simple device of the aforesaid kind, in which use is made of a rotatable potentiometer, connected to a voltage source and having a linear resistance characteristic curve, in which deviations from the desired relationship between the output voltage and the angular rotation of the input shaft ($V_u = a.\sin \varphi$) may be reduced to considerably less than 1%.

The device according to the invention is characterized in that a control-shaft, coupled with the input shaft via a transmission gear and having a control-angle $n\varphi$ ($n$ is a second constant), is coupled mechanically with the adjusting shaft by means of a catch arm seated on the control-shaft and an adjusting arm seated on an adjusting shaft, the end of the latter being coupled pivotably with the catch arm, along which it is radially slidable.

The length of the adjusting arm ($r$) is preferably greater than and, preferably, at least twice the distance ($d$) between the control-shaft and the adjusting shaft (ratio $r/d = p > 2$ to 1).

It has been found to be possible to maintain very low tolerances, if the turn $n\varphi$ of the control-shaft is restricted to about 100° from the position in which the catch arm on the control-shaft and the adjusting arm on the adjusting shaft have the same directions ($n\varphi = 0°$).

As will be explained more fully hereinafter use may be made of a potentiometer shaft which is rotatable over, for example, about 270°; this shaft being coupled with the adjusting shaft via a reduction transmission gear.

In order that the invention may be readily carried into effect, it will now be described more fully with reference to the accompanying drawing.

Figure 2:
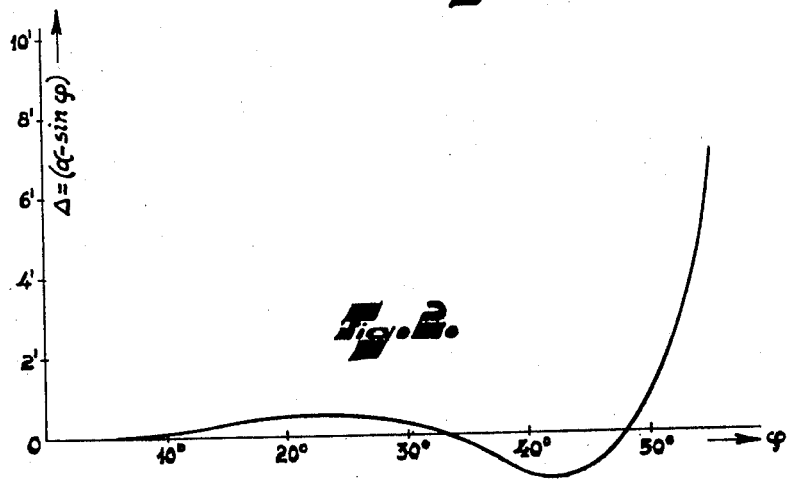

Fig. 1 shows a device according to the invention, and
Fig. 2 shows the deviation curve associated herewith.

Referring to Fig. 1, reference numeral 1 designates an input shaft having an input rotation angle $\varphi$, which is equal to the azimuth angle of a directional aerial (not shown). By means of a rotatable potentiometer 3, connected to a voltage source 2, the resistance value of which between one end 4 and the slide contact 5 varies linearly with the angular position of the potentiometer shaft 6, a voltage $V_u$ is required to be produced; to this voltage applies the equation:

$$V_u = a.\sin \varphi$$

Via an acceleration transmission gear comprising a rope 7 the input shaft 1 is coupled with a control-shaft 8, so that the control-angle of this shaft is $n\varphi$, wherein $n$ is a constant which exceeds 1, and for example, is about 2.

Via a reduction transmission gear comprising a rope 9, the potentiometer shaft 6 is coupled with an adjusting shaft 10, the adjusting angle of which is designated by $m\varphi$. The control-shaft 8 and the adjusting shaft 10 are coupled in a particular manner, i. e. by means of an adjusting arm 12, seated on the adjusting shaft, the end of this arm being arranged in a radial slit 13 of the catch arm 11, so as to be rotatable and slidable therein. The length $r$ of the adjusting arm is more than twice the distance $d$ between the control-shaft and the adjusting shaft, so that $r/d = p > 2$.

To the triangle indicated by thick lines in the figure applies, in accordance with the sine rule $$\frac{r}{\sin n\varphi} = \frac{d}{\sin (m\alpha - n\varphi)} \qquad (1)$$

or, since $p = r/d$ $$\sin n\varphi = p \sin (m\alpha - n\varphi) \qquad (1a)$$

It follows herefrom that $$m\alpha - n\varphi = \arc \sin \frac{\sin n\varphi}{p} \qquad (2)$$

To $\alpha$ consequently applies:

$$\alpha = \frac{n\varphi}{m} + \frac{1}{m} \arc \sin \frac{\sin n\varphi}{p} \qquad (3)$$

By calculation it appears that with a suitable choice of the constants $n$, $m$ and $p$, the value of $\alpha$ in accordance with (3) is, with a very small tolerance, equal to $\sin \varphi$ in the case of a variation of $\varphi$ between 0° and 50° so that $$\alpha = \sin \varphi \qquad (4)$$

The tangents to the curves (3) and (4) at the point $\varphi = 0$ coincide, if $$\frac{n}{m} = \frac{p}{p+1} \qquad (5)$$

so that, for example, $n$ may be chosen to be 2, $m = 2.819672$ and $p = 2.44$.

For the said values of the constants Fig. 2 shows the deviation $\Delta = [\alpha - \sin \varphi]$ from the value of $\alpha$ in accordance with (3) relative to the value of $\alpha$ in accordance with (4) as a variation of $\varphi$. From this deviation curve it appears that for $\varphi$ between 0° and 50° or else $n\varphi$ between 0° and 100° the greatest deviation from $\alpha$ relative to $\sin \varphi$ is only one arc minute. At a further increase of $n\varphi$ in excess of 100°, the deviation from the desired relationship increases comparatively rapidly. From the position in which the catch arm 11 and the adjusting arm 12 have the same direction ($\varphi = 0°$), the turn $n\varphi$ of the control-shaft is, consequently, restricted preferably to about 100°.

At $n\varphi_{max} = 100°$, $n\alpha_{max} =$ about 123° at the said values of the constants. By a suitable choice of the transmission ratio between the adjusting shaft 10 and the potentiometer shaft 6, an angular displacement of the latter of about 270° may be reached.

After having chosen the constant $n$ to be such that $n\varphi$ is about 100°, the constants $m$ and $p$ are preferably such that the Equation 5 is fulfilled. The factor $p$ is preferably more than 2, i. e. such that a third point of intersection of the deviation curve with the $\varphi$-shaft occurs. On the other hand $p$ must not be too high (for example lower than 5) with a view to the practical embodiment of the clutch between the control-shaft and the adjusting shaft. This aforesaid values of the constants have proved to be favourable for practical purposes.

What is claimed is:

1. Apparatus for producing voltage $V_u$ which varies linearly with a first constant $a$ multiplied by the sine of the input angle $\varphi$ of a rotatable input shaft relative to a reference point, said apparatus comprising a potentiometer having a resistance element and a rotatable slide contact therefor, said element having a resistance varying linearly between one end thereof and said contact with an adjusting angle $m\alpha$, where $m$ designates a second constant, a control shaft, transmission means coupling said control shaft to said input shaft for movement therewith to produce a control angle $n\varphi$, where $n$ is a third constant, an adjusting shaft coupled to the sliding contact of said potentiometer to drive same, a catch arm seated on the control shaft for movement therewith, a pivot means positioned on said catch arm and radially slidable therealong, an adjusting arm seated on said adjusting shaft for movement therewith, said adjusting arm being connected to said pivot means, a source of voltage connected to said potentiometer element and means for deriving the voltage $V_u$ from between said slider contact and said one end of said element.

2. A device, as set forth in claim 1, wherein the length of the adjusting arm is greater than the distance between the controlshaft and the adjusting shaft.

3. A device, as set forth in claim 1, wherein the controlangle $n\varphi$ of said controlshaft is restricted to about 100° from the position in which said catch arm and said adjusting arm have the same direction.

4. A device, as set forth in claim 1, further including a reduction transmission gear and wherein said rotatable slide contact rotates through about 270°, said contact being coupled to said adjusting shaft through said reduction transmission gear.

5. A device comprising a rotatable input shaft having an input angle $\varphi$, a rotatable potentiometer having a resistance element, a tap and a potentiometer shaft rotatable through about 270°, said resistance element having a linear variation between one end of said element and said tap and being coupled to a source of potential, and means for coupling said input shaft to said rotatable potentiometer, said means including a rotatable controlshaft having a control-angle $n\varphi$, where $n$ is a first constant, means for coupling said control-shaft to said input shaft, a catch arm rigidly connected at one end to said control shaft, a pivot means positioned on said catch arm and radially slidable therealong, an adjusting shaft having an angle $m\alpha$, where $m$ is a second constant, a reduction transmission gear coupling said potentiometer shaft to said adjusting shaft, and an adjusting arm rigidly connected at one end to said adjusting shaft, the other end of said adjusting arm being connected to said pivot means, the control-angle $n\varphi$ of said control-shaft being limited to about 100° from the position in which said catch arm and said adjusting arm have the same direction when $\varphi=0$, the length $r$ of said adjusting arm and the distance $d$ between said control-shaft and said adjusting shaft having the relation $r/d=P$ where P is greater than 1 but less than 5 and where $$n/m = \frac{p}{p+1}$$

whereby a voltage varying linearly with the sine of said input angle is produced between the tap and one end of the resistance element of said potentiometer.

References Cited in the file of this patent

UNITED STATES PATENTS 1,345,706     Routin     July 6, 1920

FOREIGN PATENTS 868,217     France     Sept. 21, 1941